Patented Aug. 15, 1933

1,922,607

UNITED STATES PATENT OFFICE 1,922,607

INSECTICIDE CARRIER, SPREADER, AND EMULSIFIER AND PROCESS OF MAKING SAME

William Hunter Volck, Watsonville, Calif., assignor to California Spray-Chemical Corporation, San Francisco, Calif., a Corporation of Delaware No Drawing. Application October 29, 1928
Serial No. 315,927

11 Claims. (Cl. 167—22)

It is known that many different substances of widely different chemical compositions including ordinary soaps (i. e. soda salts of common fatty acids) are effective detergents because they emulsify oils and such soaps have been made from the acids called "sludge" produced in petroleum refining wherein the petroleum is treated with improper quantities of concentrated or fuming sulfuric acid or without any particular control of temperature which sometimes rises rapidly during the sulfonating reaction. The sulfuric salts thus prepared have poor emulsifying and spreading properties but are much inferior to fatty acid soaps in every respect except that they are not sensitive to the hardness of natural waters. This latter property is potentially very useful provided the first mentioned difficulties can be overcome. As ordinarily prepared, soaps are dangerous to plant life if used in sufficient quantity to overcome the hardness of most natural waters and to have any useful, wetting and spreading effect and, while in spite of the danger of injury to the plant, ordinary soaps have been used in making oil emulsions for combating insects the action of ordinary soap is not as so used particularly helpful in securing "wetting" or close contact and liberal spread of emulsified oil over the surface of waxy or hairy vegetation.

I have discovered that by, first, suitably suppressing the rise of temperature during the sulfonating of oils; second, limiting the intensity of sulfonation in the sense of SO₃ strength and quantity in the acid used; third, limiting the duration of the action so that the desired bodies when found shall not be altered or destroyed; fourth, quickly diluting and separating the acids, preferentially soluble in the water layer, from those in the oil layer when the sulfonation is diluted; fifth, dissolving the intermediate sludge layer in a suitable aqueous organic solvent (e. g. ethyl or methyl alcohol); sixth, selectively neutralizing the strong acids that produce salts insoluble in the aqueous organic solvent and separating them; seventh, suitably neutralizing the remaining acid bodies as with caustic soda in a somewhat more aqueous solution; and, eighth, purifying them, I am able to secure a product of hitherto unknown properties, whether because of the absence of objectionable components or the separation of entirely new compounds, I cannot definitely determine.

It will be noted that from the very start precautions are taken to avoid the usual byproducts of high temperature or intensive sulfonation. I believe thereby I discovered that I was able to avoid the production of certain products potentially injurious to plant life and my product differs essentially from the petroleum detergents and soaps including the green acid soap hitherto made from ordinary sludge acid. In fact I have tried without success to reproduce my product using the ordinary oil refinery sludge and also tried to produce it from green acid soap without success in either case. Further, it will be noted that I have adjusted conditions of sulfonation with respect to both intensity and time, to obtain on the one hand the alteration of what I believe to be the first and simplest sulfonation products and on the other hand to avoid the destruction of what I believe to be the secondary and more valuable product which would occur if the action were allowed to proceed too far or continue too long.

My product differs both in method of preparation and character from any product known to me to have been produced from petroleum. For example, a product previously produced by severe sulfonation with the large quantities of fuming sulfuric that were usually applied, either all at once or in successive stages, to produce water-white liquid paraffins intended for internal use, contains little or none of my material. Under those conditions much coke and tar are produced which I believe to result from destruction by excess acid and elevated temperature, of the very bodies I desire to make and conserve. I prefer to avoid such methods and products. That product is water soluble "green acid". My product is best produced by very restrained and limited sulfonation at low temperatures. "Green acids" do not appear to contain substantial quantities of my product.

Another product has been obtained by vigorous sulfonation with sulfuric anhydrid gas SO₃, and even at the end contains excess SO₃, and generates much heat when diluted with water and is red in color. Here again I believe the action has been carried too far and my products have been destroyed. It may be separated by alcohol solutions of concentration between 70 and 100% to produce a product useful for detergent processes and for saponifying oils but is injurious to plants and is inadequate as a wetter and spreader whereas my product is yellow-brown to colorless and practically harmless to vegetation and has an excellent spreading and wetting effect. Numerous other methods have been described in the literature or patents and I have examined or tested all of these that I could find but nowhere, so far as I am aware, is a method described which will produce the product herein described. My method produces a water soluble, soap-like substance which compares favorably with ordinary fatty acid soaps as used in large quantities with good water in its emulsifying, spreading and wetting powers, but has no such injurious action on foliage as do the quantities of ordinary fatty acid soaps required to produce the desired wetting and spreading effect with common waters. My product involves substantially no adjustment in quantity to suit the particular water available and waste of large excess in case hard waters are encountered.

My preferred product in the usual neutralized form has the following properties:

1. It is an excellent emulsifying agent for oils, particularly the somewhat viscous and non-volatile oils useful as insecticides. In fact one part in four hundred parts of water is able to finely emulsify any desired quantity of oil by the action of the simple stirring mechanism of an ordinary spray tank instead of requiring special apparatus.

2. It is also an excellent carrier of other insecticides, such as nicotine and the like.

3. It has remarkable spreading qualities causing aqueous solutions and suspensions such as nicotine, pyrethrum, derris, oil emulsions or sulfur suspensions to wet more readily, spread more broadly, and adhere better to waxy and oil surfaces.

4. It has a marked superiority over ordinary soaps in that hardness of water does not render it ineffective or require it to be used in substantially greater quantity.

5. It operates effectively in acid, saline or alkaline waters so that oil emulsions produced with my product may be diluted indefinitely with ordinary waters instead of using distilled water as required with large dilutions of ordinary soap emulsions that are acted on or curdled by alkaline, saline or acid waters.

6. It is bland, neutral and non-injurious to plant tissues in any reasonable quantity and, when properly separated or purified from the oil-soluble tarry matters may be applied without injury to the plants in concentrations many times as great as is necessary to produce emulsification, wetting or spreading.

While the chemistry of the sulfonation products of petroleum is far too complicated to permit exact definition of these compounds chemically, my product differs radically from the ordinary sulfonic acids of sludge acid and I believe it is rather a different organic sulfur acid, a sort of oxygenated sulfur compound of an organic acid or addition product formed from unsaturated hydrocarbons, than a true sulfonic acid at all, and it is further characterized by the exclusion or removal of both active and latent phytocidal impurities owing to the combination of the special conditions of so-called sulfonation with the selected solvents and concentrations thereof used in its purification.

Without intending to limit my process to the raw stock herein described or the precise conditions, strengths or proportions of the process here given but to enable any one skilled in the art of treating petroleum products to manufacture my carrier and spreader, recognize the same and adjust the conditions of treatment to suit other petroleum raw materials, I will give a specific example as applied to .eutral brown lubricating stock obtained from California crude petroleum.

Two volumes of lubricating stock such as brown neutral oil are mixed under continuous and rapid agitation with one volume of acid, ordinary 95 to 97 percent sulfuric acid, for thirty minutes at a temperature approximately 35° to 40° C. The reactivity of the oil in commercial batches tends to cause excessive heating and the material should be suitably precooled or else the mixture intimately cooled to avoid the rise of temperature above 50° C.

One feature of this process is the control of temperature during the reaction and terminating the reaction in the minimum time so that the useful product acids produced will not be destroyed. I find that the temperature of the reacting mass of sulfuric acid and mineral oil must not be allowed to rise materially above 50° C. and that the lowest temperatures compatible with a satisfactory reaction produce the best grade of water soluble product acid. With proper temperature control I find that either ordinary concentrated sulfuric acid or 20% fuming acid may be employed.

The production of this useful product acid is also possible by the use of a proportional quantity of fuming sulfuric but it is then preferable to add the fuming acid gradually to the oil while the agitator is running and also to cool the reacting mass as with a water bath surrounding the agitating vessel and preferably cooled agitators, etc.

At the end of the reaction time one volume of water is added to this mass, and mixed by the same rapid agitation until uniformly distributed. The mass is then allowed to stratify into three layers. The upper layer consists of oil and oil soluble sulfonic acids. The middle layer consists of some oil, sulfonic acids, sulfonic tars, organic sulfur bodies, sulfuric acid, water, some sulfurous acid and the bodies in which I am interested. The bottom layer consists essentially of sulfuric acid and water.

The oil layer (upper) and the acid layer (lower) are then removed from the middle layer which is a thick greenish black mass and may even show a purple color in thin layers.

The separated middle layer is then dissolved in three volumes of alcohol (methyl or ethyl) and dry finely powdered soda ash (sodium carbonate) added under agitation until the strong free acids are neutralized and precipitated as salts insoluble in alcohol of this concentration.

The aqueous alcohol is then filtered to remove the precipitated salts. The resulting alcoholic filtrate is then further diluted with an equal volume of water and either exactly neutralized with a solution of sodium hydrate, or may be made alkaline with ammonia.

The filtrate is then placed in a still to remove and recover the excess of alcohol. When the alcoholic content of the filtrate has been reduced to approximately ten percent by volume, the filtrate is removed from the still and placed in a closed agitating vessel where it is heated to 50° C. and mixed with approximately one-third its volume of benzol (benzene) to purify it. After sufficient agitation the mixture is allowed to stratify and the lower layer containing my product in solution is drawn off from below. This benzol washing is repeated three or four times or until the sulfonic tars have been practically all removed.

Petroleum ether and other light solvents may be substituted for benzol but I prefer benzol because, in my experience, benzol is most capable of completely removing the sulfonic tars.

After the solution has been washed with benzol it is returned to the still where the dissolved benzol and remaining alcohol are removed by further distillation.

The resulting purified product may be reduced to any desired consistency by evaporation. When reduced so as to contain 30 to 40 percent solids my product is a brown colored syrupy liquid completely soluble in water and in alcohol and contains practically no oil soluble matter. The color is variable from light brown to nearly black depending on the time and temperature of the original reaction and on the oil stock used. In general the lighter colored acids are of superior quality.

I believe the larger proportion of unsaturated bodies in the crude oil fraction selected, the larger will be the proportion of my product produced therefrom; the more carefully the temperature of "sulfonation" is restrained below 40° C. the more safe and more stable my product will be; the more carefully the amount of sulfuric acid used is restricted to that required for the union with the particular oil, the freer my product will be from phytocidal impurities; the more carefully the time of reaction is limited to about one-half hour or less, the smaller will be the injury by any excess of sulfuric acid that may be present and finally the more careful and exhaustive the final scrubbing with benzol, the more certain the phytonomic safety of my product. Other solvents non-miscible with water may be used at this point of the process, such as petroleum ether but in my experience no other solvent is so safe and certain as the benzol, if adequately applied. The amount of alcohol used in solving the middle layer should be varied somewhat in proportion to the amount of water included in this layer by the particular oil under treatment and it will be noted that whereas others have used alcohol stronger than seventy-five percent on the one hand and still others have used alcohol weaker than 50% for extracting or removing the particular groups of products they desired to separate from so-called acid "sludges", I believe the best results are obtained for my purpose when applied to this middle layer which is unlike the usual acid sludge with an alcoholic strength of about 70% after mixture when employed in the way I describe, hence the amount of alcohol used should be varied somewhat with the aqueous content of the middle layer. On the other hand unlike the processes hitherto used I prefer to have only about half that proportion of alcohol present when the neutralization is accomplished and to do this with caustic soda in nearly exact quantity cold. Finally I prefer to have some alcohol present when the benzol washing is carried out and to have the product material largely or wholly in such very weak alcoholic solution to insure I believe the rapidity and completeness of removal of all objectionable tarry and deleterious impurities. With these points in mind I believe it is practicable to secure a modicum of my product from the suitable fractions of California, Mexican, Texas, Mid-continent or Pennsylvania crudes but the amounts obtainable will vary not only with the source of oil but also the fraction and the conditions of distillation. By the term "relatively heavy mineral oils", as used herein and particularly in the claims, I mean mineral oils having a molecular weight heavy enough to be at least suitable for lubricating purposes. By the term "crude sludge" is meant thick mud-like product that is obtained by the action of sulfuric acid on mineral oils, such as those obtained from oil wells.

Consequent upon this variation, I do not wish to limit myself to the conditions of the specific example given but only to the substantially equivalent character of the product obtained and to the general steps of the method by which it is obtained and applied. The exact chemical nature of the acid substance characteristic of my novel emulsifying and spreading and dispersing agent, I have been unable to ascertain except that it is composed in some manner of a portion or residue of the petroleum molecules, which I call a petroleum residue, combined with oxygenated sulfur in some form. Whether all the oxygen is combined with the sulfur or some of it is present as OH or COOH groups otherwise attached, can not at present be stated with certainty.

I claim:

1. The process of producing a new organic sulfur acid component from relatively heavy mineral oils which consists in reacting these oils with sulfuric acid, controlling the temperature at least 35° to 40° C. for substantially one-half hour.

2. The process of producing a new organic sulfur acid component from relatively heavy mineral oils which consists in reacting these oils with substantially half their weight of strong sulfuric acid, controlling the temperature at about 35° to 40° C. for substantially one-half hour.

3. The process of producing a new organic sulfur acid component from relatively heavy mineral oils which consists in reacting these oils with sulfuric acid, controlling the temperature at about 35° to 40° C. for substantially one-half hour and eliminating therefrom substantially all phytocidal impurities.

4. The process of producing a new organic sulfur acid component from relatively heavy mineral oils which consists in reacting these oils with substantially half their weight of strong sulfuric acid, controlling the temperature at about 35° to 40° C. for substantially one-half hour and eliminating therefrom substantially all phytocidal impurities.

5. The process of producing a new organic sulfur acid component from relatively heavy mineral oils which consists in dissolving crude sludge from such oils in aqueous alcohol, neutralizing the same with finely powdered soda, using the alcohol and soda until the solution is substantially free from inorganic salts and then washing the aqueous solution of the clear filtrate therefrom with benzolic liquid until substantially all sulfonic tars and other oil soluble matter are removed.

6. The process of producing a new organic sulfur acid component from relatively heavy mineral oils which consists in dissolving crude sludge produced by carefully restrained sulfonation of a petroleum fraction of such mineral oils in aqueous alcohol, neutralizing the same with finely powdered soda, using the alcohol and soda until the solution is substantially free from inorganic salts and then washing the aqueous solution of the clear filtrate therefrom with benzolic liquid until substantially all sulfonic tars and other oil soluble matter are removed.

7. A product derived from petroleum characterized by the facts that while it contains an oxygenated sulfur compound which is an organic petroleum acid, the ordinary water solutions of its salts are bland, neutral and substantially harmless to vegetation in concentrations about 3%, in which concentrations it has the properties of finely emulsifying viscous oils in water by ordinary agitation and causing the aqueous emulsions and dispersions to wet quickly and to spread widely on vegetable surfaces normally repellent to water.

8. Process of preparing oil-water emulsions which consists in using therein oil, water and a petroleum sulfur acid compound substantially free from sulfonic tars, other oil soluble matters from the petroleum and like material injurious to delicate plants which compound has the property of increasing the wetting and spreading power of water sprays.

9. The method of dispersing insecticidal substances in aqueous spray solutions which consists in combining with the water a purified product of petroleum refining sludge and agitating the combination with the insecticide being dispersed.

10. The method of dispersing insecticidal oils in aqueous spray emulsions which consists in combining with the water a purified product of petroleum refining sludge and agitating the combination with the insecticide being dispersed.

11. An insecticide spreader and emulsifier consisting of an acid reaction product comprising a petroleum residue containing oxygenated sulfur and having the properties of being water soluble and free from phytocidal ingredients.

WILLIAM HUNTER VOLCK.